US011488466B2

(12) United States Patent
Lewis

(10) Patent No.: US 11,488,466 B2
(45) Date of Patent: Nov. 1, 2022

(54) WEARABLE PERSONAL OR PUBLIC SAFETY DEVICE

(71) Applicant: Ray P. Lewis, West Des Moines, IA (US)

(72) Inventor: Ray P. Lewis, West Des Moines, IA (US)

(*) Notice: Subject to any disclaimer, the term of this patent is extended or adjusted under 35 U.S.C. 154(b) by 0 days.

(21) Appl. No.: 16/200,610

(22) Filed: Nov. 26, 2018

(65) Prior Publication Data

US 2020/0168074 A1 May 28, 2020

(51) Int. Cl.
*G08B 25/01* (2006.01)
*G08B 25/10* (2006.01)
*G08B 25/08* (2006.01)
*H04W 4/029* (2018.01)
*G06Q 50/26* (2012.01)

(52) U.S. Cl.
CPC .......... *G08B 25/016* (2013.01); *G08B 25/08* (2013.01); *G08B 25/10* (2013.01); *H04W 4/029* (2018.02); *G06Q 50/265* (2013.01)

(58) Field of Classification Search
CPC ......... H04W 4/90; H04W 4/02; H04W 84/18; H04W 40/22; H04W 4/023; H04W 4/185; H04W 64/006; H04W 76/10
See application file for complete search history.

(56) References Cited

U.S. PATENT DOCUMENTS

| | | | |
|---|---|---|---|
| 5,742,233 A | 4/1998 | Hoffman | |
| 6,624,754 B1 | 9/2003 | Hoffman | |
| 7,015,817 B2 | 3/2006 | Copley | |
| 7,602,303 B2 | 10/2009 | Douglas | |
| 7,682,069 B2 | 3/2010 | Hyatt | |
| 9,922,537 B2 | 3/2018 | Shah | |
| 10,460,590 B2* | 10/2019 | Strack | G08B 25/016 |
| 2012/0007735 A1 | 1/2012 | Rhyins | |
| 2016/0286156 A1* | 9/2016 | Kovac | H04N 5/772 |
| 2017/0229004 A1* | 8/2017 | Shah | F41H 9/10 |
| 2017/0330443 A1 | 11/2017 | Helferich | |
| 2018/0275859 A1* | 9/2018 | Hodge | H04L 63/102 |

FOREIGN PATENT DOCUMENTS

| | | |
|---|---|---|
| CN | 104900006 A | 9/2015 |
| CN | 105741483 A | 7/2016 |
| WO | 2018004022 A1 | 1/2018 |

\* cited by examiner

*Primary Examiner* — Kwasi Karikari

(74) *Attorney, Agent, or Firm* — Parker Poe Adams & Bernstein LLP

(57) ABSTRACT

Most embodiments of the invention are for a public safety device that is typically worn and may collect various types of information from stimuli, whether from the environment or, if worn, then also from the body wearing the device. The device is typically in constant communication with at least one remote server. In certain embodiments, the device may communicate instrument data to be processed by a remote computing device to detect a combative situation and relay an emergency signal. In other embodiments, based on certain input from the various instruments measuring the stimuli, the device itself may detect a combative situation and transmit an emergency signal.

20 Claims, 6 Drawing Sheets

WEARABLE PERSONAL OR PUBLIC SAFETY DEVICE

BACKGROUND

Public safety is increasingly important in the United States and elsewhere. Law enforcement officers, security service employees, members of the military service, government officials, and members of the public may frequently find themselves at risk of imminent combative situations (such as bank employees, convenience store employees, gas station employees, and individuals on probation). In general, a combative situation is typified by a physical altercation that emerges very quickly, with little to no notice, at times spontaneously, and involves a significant risk of bodily injury and, in some cases, untimely deaths. Combative situations generally cause those involved to become unable to focus on or perform any other task except those tasks directly related to managing the combative situation. Such tasks may involve hand-to-hand combat, combat with weapons, and sometimes individuals may literally be fighting to survive or to protect the survival or bodily integrity of others, including, but not limited to, colleagues, members of the public, or other people or property that the individual has been hired to or elected to protect, from death, bodily injury, damage, or destruction. In 2017, as part of a yearly review, the FBI collected assault data from over 12,000 law enforcement agencies employing hundreds of thousands of law enforcement officers. The report found that just over 60,000 officers had been assaulted while conducting their duties in 2017, which was a rate of assault of 10.1 per 100 sworn officers. See FBI, UNIFORM CRIME REPORT, Law Enforcement Officers Killed and Assaulted, 2017, available at https://ucr.fbi.gov/leoka/2017/. In the last ten years, over 1,500 law enforcement officers have been killed, with many of these fatalities apparently resulting from combative situations. See National Law Enforcement Officers Memorial Fund, Washington, D.C. 20004-2025; LAW ENFORCEMENT FACTS, available at http://www.nleomf.org/facts/enforcement; CAUSES OF LAW ENFORCEMENT DEATHS, available at http://www.nleomf.org/facts/officer-fatalities-data/causes.html.

Currently, in a typical combative situation an individual will face multiple decision points at quick intervals, in many cases in rapid succession. Sometimes decisions about actions, next steps, and task(s) upon which to focus must be made in seconds or mere fractions of a second. Failure to make the correct decision(s), or failure to make any decision(s) quickly enough, can and does result in death, bodily injury, damage, or destruction. The following is a non-limiting example of how a combative situation may begin. A law enforcement officer approaches a vehicle during a routine traffic stop. The officer asks the driver or passenger(s) to exit the vehicle, e.g., based on questioning, department procedure, reasonable suspicion, or probable cause. After the driver or passenger(s) exit(s) the vehicle, he or she unexpectedly physically attacks the officer by attempting to tackle the officer and reach for the officer's service weapon, or engages the officer through the use of a weapon or firearm. Because of the unexpected nature and seriousness of the altercation, the officer's attention may be completely consumed with survival or preserving the safety of others, and he or she may be unable to quickly respond to a call from dispatch, call for backup, or inform his or her agency about the situation. Combative situations may occur in a variety of different contexts and may be caused by many types of altercations, including, without limitation, targeted attacks, random attacks, terrorist attacks, and crimes of opportunity. Typically, even though the perpetrator of a combative situation may have premeditated the situation, it is likely to be largely or completely unexpected for those involved or drawn into such combative situations, such as the officer. Generally, even if combative situations are resolved favorably with respect to physical safety, there can be lasting adverse mental and emotional consequences, including, without limitation, post-traumatic stress disorder. In many combative situations, the aggressor or perpetrator is unknown or cannot be prosecuted or brought to justice. Accordingly, innocent law enforcement members and citizens may be fearful of crime where they live and work. Consequently, there is a dire need for those who are expected to be in or sufficiently near a combative situation, whether such expectation is actual, threatened, real, or perceived, to be able to communicate to others that such a situation is occurring just before, while, and after it happens. Furthermore, issues with errors in human memory and certain physical evidentiary issues can plague judicial or quasi-judicial proceedings or hearings where sufficient evidence is required to prove a fact. Thus, there is a need to provide further data to better assess combative situations after they occur and provide undisputable evidence to help resolve such hearings or proceedings. Still further, there is a need to reduce crime and protect innocent members of society and law enforcement officers by analyzing a data record about a combative situation to find the perpetrator or aggressor.

SUMMARY

The following presents a simplified summary of the invention in order to provide a basic understanding of some aspects of the invention. This summary is not an extensive overview of the invention and is not intended to be limiting in scope nor exhaustive in breath. It is not intended to identify key or critical elements of the invention or to delineate the scope of the invention; its sole purpose is to present concepts of the invention in a simplified form as a prelude to the more detailed description that is subsequently presented.

In certain embodiments of the invention, a device is capable of being connected to a user comprising instruments, pre-programmed instrument metrics, a central processing unit, and a wireless communications apparatus. At least one instrument may determine location information, at least one instrument may determine the presence of loud voices, and at least one instrument may be capable of determining a user's pulse. In some embodiments, a central processing unit can determine vector information based on the location information, although this can be processed remotely or outside of the device as well. The central processing unit can determine a combative situation based on a sudden change in vector information, loud voices, and the increased pulse of a user, as well as from other factors, and in such a situation the device transmits an emergency signal through the wireless communications apparatus to a remote computing device. The remote computing device may comprise at least one server owned or leased by a law enforcement agency. In certain embodiments, the device is implanted. In other embodiments, the device further comprises at least one instrument that is a camera. In certain embodiments, the device is worn by a law enforcement officer as part of his or her duties, and may have video camera output in the typical human visual field, that is routinely stored with other instrument output by a law enforcement agency. In still other embodiments, law enforcement officials may monitor emergency signals and respond by sending other law enforcement officers to combative situations. In certain embodiments, the device may be worn by prisoners, jailed individuals, or detainees. Further, a wireless communications apparatus that is localized to a prison, jail, detention facility, and its perimeter may be integrated with the device. Prison, jail, or detention officials may monitor emergency signals and respond by visiting the location of the device.

In further embodiments, the invention may comprise a system comprising a plurality of wearable devices comprising at least one instrument that can determine location information, at least one instrument that can determine a user's pulse, at least one instrument that can determine the presence of loud voices, at least one central processing unit capable of determining vector information based on the location information, and at least one wireless communications apparatus capable of sending an emergency signal; and a proprietary network connected to the internet capable of communicating with the plurality of wearable devices. In some embodiments, such proprietary network may receive the emergency signal from at least one such wearable device and transmit a subsequent communications signal to at least one law enforcement official, and such subsequent communications signal provides real-time location information and vector information from the device. In other embodiments, the system's proprietary network comprises at least one server owned or leased by a law enforcement agency. The law enforcement officials may be selected from at least one of the following: local police, state police, federal agency. The system may comprise at least one coordinating official is monitoring real-time location information and vector information. In certain embodiments, each device may have at least one instrument comprising a camera with a video output in a human field of vision. In other embodiments, said subsequent communications signal further provides real-time camera output.

In still other embodiments, a device contemplated by the invention is capable of being affixed to a vest comprising a plurality of instruments, pre-programmed instrument metrics, a central processing unit, data storage, and a wireless communications apparatus. In certain embodiments, at least one instrument can determine location information compared to a base station unit affixed to a vehicle; at least one instrument can determine the presence of force applied to a body wearing said vest; at least one instrument comprises a video camera; at least one instrument comprises an audio recorder; at least one instrument is capable of determining a user's pulse. In certain embodiments, the central processing unit can determine vector information based on the location information; the central processing unit can determine a combative situation based on any combination of one stimulus or more to an instrument compared to one or more pre-programmed metric, and/or the device transmits an emergency signal through the wireless communications apparatus to a law enforcement agency. In other embodiments, the vest is a protective vest used by an on-duty law enforcement officer, and the vehicle may be a police cruiser owned or operated by a local law enforcement agency. In other embodiments, the device begins to gather instrument readings and compare them with pre-programmed metrics only when a law enforcement officer exits the vehicle.

Further features of the present invention will be apparent from the description that follows. After review, such features may, in part, be obvious from the description or may be learned by practice of the invention. It is to be understood that both the foregoing general description and the following detailed description are exemplary and explanatory only and are not restrictive of the invention, as claimed.

DETAILED DESCRIPTION OF FIGURES AND EMBODIMENTS

Having generally summarized the invention disclosure above, a further understanding can be obtained by reference to certain specific examples illustrated below which are provided for purposes of illustration only and are not intended to be all inclusive or limiting unless otherwise specified. Accordingly, term or phrases such as "for example" or "e.g." and the like, even if they are not coupled with a modifier such as "without limitation" or the like, are not intended to be limiting of the disclosure of the invention.

Reference now will be made in detail to embodiments and examples of the present invention. The particular components and amounts thereof recited in these examples, as well as other conditions and details, should not be construed to unduly limit this invention.

Figure 1:
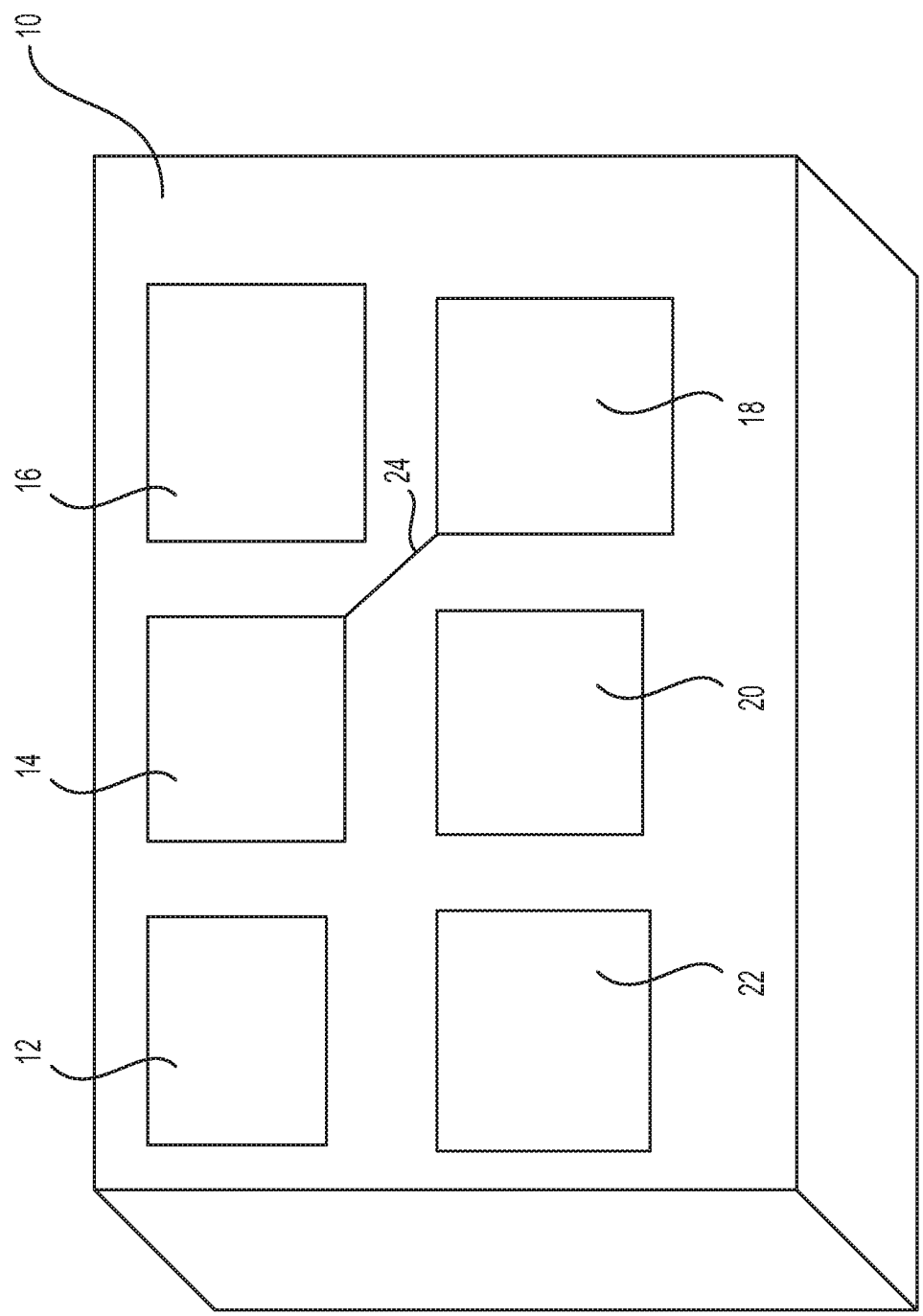
FIG. 1 illustrates an overview of an embodiment of the invention and certain functional modules.

FIG. 1 illustrates an embodiment of a personal or public safety device 10. This paragraph presents a general overview of the functionality of the device and examples of usage. However, it is understood that this overview is non-limiting and that further embodiments and features of the device 10 and invention are explained in more detail herein. Generally, the device 10 is worn by a person who expects or wishes to mitigate the risks associated with becoming engaged in a combative situation. In other embodiments, the device may be implanted under or on the skin, or attached to the body through a separate implanted device. The device 10 contains instruments 14 that measure external environmental and physiological phenomena. The device 10 converts the measurements into data, processes the measurements through a computing module 18, analyzes the data, including by comparing the data to preset values, and then determines based on such comparison whether a combative situation exists or is likely to exist. The device 10 then sends its conclusions about the existence or likelihood of a combative situation to a proprietary computer based remotely. Sometimes in addition to sending the device's 10 locally determined conclusions about a combative situation, the device 10 also sends raw instrument data and/or pre-processed instrument data as well. The device 10 also sends with its communication certain data about the current time, location, device identification, and location information. The remote proprietary computer receives the signal about the combative situation from the device 10 and is programmed to immediately contact at least an administrator/dispatch through a variety of means, including voice call, text, page, email, siren, room or building light changes or any combination thereof. Such contact with at least an administrator/ dispatch will typically include information sufficient for anyone contacted to respond to the combative situation by providing assistance.

Further examples, details and embodiments follow further below, and set forth in this paragraph is a general example embodiment of the invention and its functionalities. An on-duty police officer wearing a device 10 on his wrist may pull over a driver. The driver may exit the vehicle and begin to attack the officer. The device 10 will immediately detect changes in movement or range of motion, amount of force used, the officer's increased heart rate due to an adrenaline surge from being attacked, and the sounds of loud voices, scuffling, car door slams and/or weapons discharging. The device 10 analyzes this instrument data, compares it to pre-programmed values indicating "normal" and "non-normal" instrument data, and determines that there is a high likelihood of the occurrence of a combative situation. Typically, information that is analyzed includes vector information about the presence of the officer relative to his or her vehicle. This information can sometimes be the best predictor of a combative situation because erratic information can detect a fight, and fast movement away from the vehicle can detect a pursuit of a perpetrator. After the data analysis, the device 10 signals computers based in the officer's law enforcement agency headquarters or local precinct and indicates the presence of a combative situation and a certain confidence interval determined by the number of instruments that may be in a non-normal range. Based on the information received from device 10, the law enforcement agency can quickly or immediately dispatch officers or others to help or assist the officer involved in the combative situation.

A typical device 10 will contain an antenna 12 or other wireless transmission device. The antenna 12 permits the device to communicate, either constantly, with periodicity, or upon certain conditions, with other remotely located devices. In one embodiment, the antenna 12 utilizes cellular technology such as 2G, 3G, 4G, 5G and/or LTE to communicate with a commercial wireless provider to transmit and receive information. Because of the wide availability of the commercial cellular service, this permits device 10 to generally communicate via antenna 12 with other devices from anywhere such cellular service or backup service is available. In other embodiments, the antenna 12 may contain transmission technology such as Bluetooth, Z-wave, Wi-Fi 802.11 b/g/n/ac, and antenna technology to permit communications through frequencies utilized by government agencies, military, law enforcement agencies, emergency, and/or public service networks. In certain embodiments, wireless technology (in particular, but without limitation, Bluetooth, Z-wave, and Wi-Fi) permit one device 10 to communicate with other devices 10 either worn by the same user, affixed to non-users, or to devices 10 in the same general geographic vicinity.

A typical device 10 will also contain at least one, and typically a plurality, of instruments 14. As discussed further, a collection of different instruments 14 are available for usage in the device 10. Certain instruments 14 may be selected by a user or a purchaser to maximize the usage of the device 10. Broadly, instruments 14 may be selected for measuring different categories of human physiology, or environmental measurements; there could be overlap between the two categories. The instruments 14 in a device 10 include, without limitation, at least one, and with the option of having a plurality of any of the following instruments: heart rate monitor, blood oxygen level monitor, blood pressure monitor, voice monitoring microphone, environmental sound microphone, electromagnetic detector (including, without limitation, detection in the visible light spectrum, and also the invisible light spectrum), camera, video recording, air pressure sensor, temperature sensor, electrodermal activity (and other somatic markers known in the art, such as measurements of the sympathetic nervous system), sweat (including rate of sweat and chemical components thereof, such as cortisol), range-of-motion, vector of travel, location sensors (including, without limitation, GPS, GLONASS, and cellular tower location), accelerometer, gyroscope, wireless radio signal detector, water or liquid detector, and/or chemical detector. Other instruments commonly known to those in the art would also be understood to be included as instruments 14 in the device 10. Typically, instruments 16 would be understood to be selected based on the likelihood of their detecting a combative situation, and so would include microphones for voice detection, physiological stress measurement instruments such as heartbeat and sweat, range and rate of motion detectors such as accelerometers and gyroscopes, and location information instruments such as GPS. However, depending on the unique attributes of an expected combative situation, or unexpected combative situation for which risk is being mitigated, the instrument 16 selection could vary significantly. Additionally, instrument selection 16 could vary based on budget, in particular when a plurality of devices 10 are being purchased at a time such as in bulk by a law enforcement agency for distribution to service officers. Certain embodiments of the invention may include all of the instruments expressly listed above and more, although typical embodiments would not. In typical apparatuses or devices described herein, the device and all associated instruments may have the option to be waterproof or water resistant.

In further embodiments, an instrument 14 or a plurality of instruments 14 in a device 10 may focus on detecting range of motion or force applied to an officer. As an example, in certain combative situations an officer may be struck or engaged with a blunt object. Such an interaction with such an object would create an atypical amount of force on the officer's body that may be detected by the instrument(s) 14. As is typical of the instruments 14 generally, certain patterns of data collected from such instruments 14 would immediately indicate a combative situation based on expected or probabilistic patterns of impact for certain weapons that may be encountered in combative situations. In further embodiments, an officer removing his or her service weapon from its carrying location would trigger an instrument 14, including an instrument focused on range of motion. For those weapons that can be discharged, a discharge would also trigger at least one instrument in the device 10. For example, an electrical device such as a Taser, or a firearm such as a weapon with an explosive or gas fired projectile such as a pistol could trigger an instrument 14 in the device 10 through electrical means or signaling before the discharge, i.e., from brandishing the weapon, or from the discharge itself, i.e., an instrument 14 linked to a trigger, or through the range of motion following the discharge such as a wrist or arm movement or the impact of the force on the officer's body from the discharge. In a further embodiment, an instrument 14 comprising at least one gyroscope may detect movement and/or force associated with brandishing or discharging a weapon, such as "kickback." Additionally, such an instrument 14 comprising at least one gyroscope may detect force or movement caused by an officer being attacked with a weapon, including a firearm or Taser. Further, an instrument 14 comprising at least one gyroscope may determine a type of stance that an officer may take, such as a defensive or offensive stance in connection with a combative situation or anticipating the same. Accordingly, the device could transmit a signal indicating the above, including, but not limited to, stance, impact of blunt force or other weapon or firearm force, combative situation, occurrence of a weapon was brandished and/or was discharged. In such embodiments as described herein, the instrument(s) 14 may be configured and/or calibrated to a type of model of weapon and/or or to the officer's body type or weight. Such configuration or calibration may reduce false positive signals of the occurrence of a combative situation. Thus, embodiment(s) with these types of instrument(s) 14 would provide further data or information to permit an appropriate signal to the law enforcement agency or otherwise contact law enforcement for assistance.

It would be understood by one in the art that there may be reasons why a plurality of the same type of instrument 14 may be selected include: having redundant instruments in case of failure, having additional instruments 14 to monitor measurement deviation over time to flag tuning or maintenance, or to capture different aspects of the measured phenomena such as a different ranges, or multiple readings that can be compared, or simply different aspects of the same phenomena. For example, multiple gyroscopes can be used to measure more aspects of acceleration and positioning in different dimensions, while a more basic accelerometer can also more measure simpler of acceleration. As another example, a microphone can better capture human voice from a user wearing the device 10 and a separate microphone on the unit could also better capture human voice from non-users.

A typical device 10 will also contain at least one battery 16. A battery 16 provides power to the device 10 and its components. Multiple batteries may be expected to be used to provide backup power to the device 10, or to provide additional power for when multiple instruments 14 or other components 12-22 are operating at the same time. Typically, the battery 16 would be a commercially available rechargeable type of battery relying on an alkali metal such as lithium. However, other batteries 16 known in the art are contemplated including, without limitation, those relying on nickel, cadmium, lead, zinc, or aluminum.

A typical device 10 will also contain a computing module 18. Broadly, the computing module operates as a standalone programmable mini-computer and/or microcontroller. Accordingly, the computing module 18 will typically contain at least one processing unit, including, but not limited to, a central processing unit or CPU, working memory storage, and also may contain long-term data storage unit. The computing module 18 is typically connected 24 to the other components 12-16, 20-22, including the battery 16, through at least one two-way data transmission channel 24 (shown in the figure is only a representative connection between the computing module 18 and the instrument module 16). Through the data connections 24, the computing module would be expected to receive data input from the components 12-16, 20-22 on either on a continual basis a periodic basis, or subject to certain conditions. Additionally, the computing module would be expected to transmit data to the components 12-16, 20-22 either on a continual basis a periodic basis, or subject to certain conditions. As one example of an operational embodiment, the instruments 14 of the device 10 transmit data to the computing device 18 which processes the data and transmits it to the antenna 12 for subsequent external transmission.

A typical device 10 may contain a data module 20 separate from any memory or data component that may be present in the computing module 18. The data module 20 is connected to at least the instruments 14 and computing module 18 by data channels 24 and can serve as extra short-term memory or medium or longer term data storage for the computing module or instruments 14. Additionally, the data module 20 and data channel connections 24 are all sized in terms of total data capacity, write speed, and read speed to permit the capture of a constant or near-constant stream of data input to or from the instruments 14 and computing module 18. For example, during a combative situation all of the instruments 14 or at least certain high priority instruments 14 (e.g., dependent on the combative situation or physical placement or geographical location of the device 10) may be capturing data at a very high rate throughout and will need to store the data in the data module 20 for real-time or subsequent processing by the computing module 18. A plurality of data modules 20 may be used to further accommodate the instruments 14 and resulting data, or the functions of the computing module 18.

A typical device 10 may contain a human user interface 22. The human user interface 22 permits interaction with the device 10 and with internal components 12-20, 24 of the device 10 for maintenance, setup, diagnostics, control, or information output in any human understandable or readable format. The interface 22 typically also includes a display that may provide passive information about the environment, such as time and weather. The interface 22 display further may be able to be controlled by a completely independent device such as a phone so that it could display text messages or other information from the phone. Other features known in the art for a display on a wearable device are also contemplated. Typically, the human user interface 22 would not be used in a combative situation, but in certain embodiments a portion of the interface 22 may include at least one button that a user or other person in the situation could rely on to transmit an emergency signal to others.

Although not expressly shown in FIG. 1, the components 12-22 of the device 10 are all expected to be connected to each other through two-way data transmission channels 24 (such data connection includes to the battery which may have an attached sensor to provide data about its status, charge, voltage or current output or input). Additionally, the battery 16 is expected to be connected to each of the components 12-14, 18-22 to supply power.

In further embodiments, at least one instrument 14 is a camera, and the device 10 containing a camera instrument 14 is affixed to, part of, connected or interconnected to, or operates as an officer body camera unit. Such body camera units are generally worn by law enforcement officers to preserve information and data pertaining to how an officer conducted his or her duty. The information or data is regularly uploaded law enforcement servers and monitored. In the event of a combative situation or other incident, such information or data may be retrieved by law enforcement and provided to supervisors, attorneys, or to the public. The device 10 is contemplated in certain embodiments of the invention to either be a standalone officer body camera device, or, in other embodiments, to connect to an officer body camera device. In the latter embodiments, the device 10 is used to accentuate collection of information and data that may be correlated or aligned with a separate camera output from the body camera device. In many cases, existing officer body camera data is unable to fully capture the full scope of what may or may not have occurred in a combative situation or incident. Thus, the device 10 is extremely useful when instruments other than human visual field information or data are captured by the device 10 yet may be correlated or aligned with traditional camera output to more fully reveal a factual timeline of events in a combative situation or other occurrence or incident.

Figure 2:
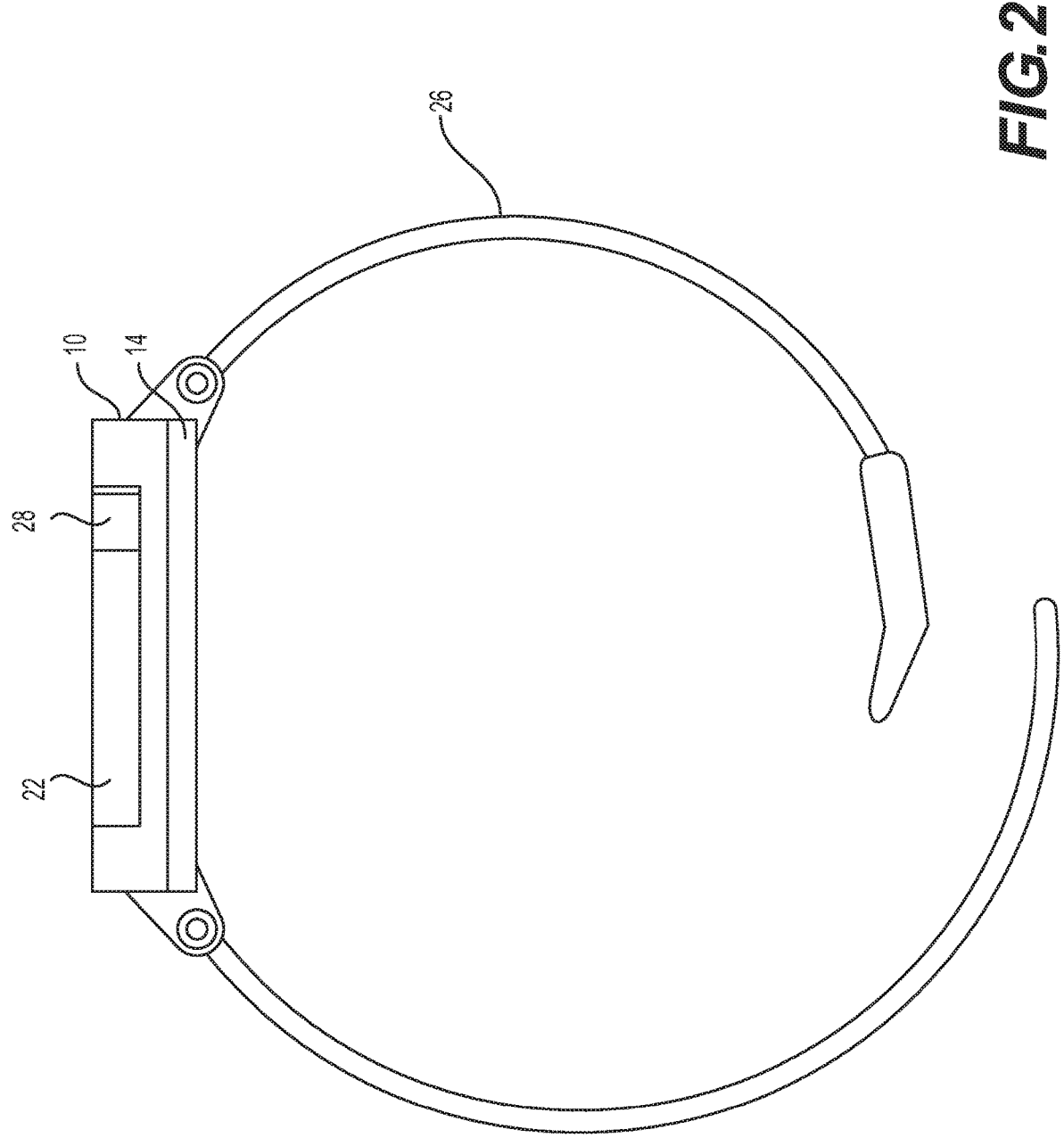
FIG. 2 illustrates an embodiment of the invention as a wearable device affixed with a strap.

FIG. 2 illustrates an embodiment of a wearable personal or public safety device 10. The human user interface 22 in this embodiment is visible from the top of the device and would be understood to display at least time as well as basic instrument readouts. The instruments 16 in this embodiment are located on the bottom the device 10 because certain of the included instruments 16 would be expected to be in close contact with a user of the device 10 to permit measurement of certain physiological data such as, but not limited to, measurement of oxygen level, somatic markers, sweat (and chemical components thereof such as cortisol), and/or temperature. A strap 26 allows the device 10 to be worn (or, e.g., without limitation attached to, or linked to) an officer who may be at risk of a combative situation or physical altercation. A substantial portion of the strap 26 in this embodiment may optionally be integrated with at least one instrument 16 in this embodiment to detect physiological data of a user when the strap 26 is worn around the body of a human or animal (such as, without limitation, when worn around an appendage, torso, neck, chest, abdomen, leg, or arm), e.g., without limitation, an integrated instrument 16 and a strap 26 may permit the detection of cardiovascular data such as blood pressure and heart rate. The invention also contemplates other measurements as well through instruments 16 that are more efficient or designed for integration or improved measurement with an annular or substantially annual object around a body region or part.

Typically, the embodied device 10 of FIG. 2 is worn by a member of law enforcement, the military, and security service employees, but may also be worn by members of the public concerned for their safety. Additionally, the invention contemplates that linking the device to such an individual can include, but is not limited to, mechanical affixing other than a strap, magnetic affixation, buttons, and also physical placement or affixation near the individual or on or affixed to a physical object with which the individual is typically nearby or moves with. As non-limiting examples of the above, such a device could be affixed or worn to an individual's physical body, and also to the body of an animal such as those employed or relied upon by a law enforcement or military agency, or by certain disabled individuals. In one embodiment, a device could be integrated with a collar used by a law enforcement service dog. The device could also be affixed to a personal property item or employer-owned item such as an individual's or family member's cellular telephone, personal or service vehicle, wallet, purse, or luggage. Any individual may be connected or may be wearing more than one device 10, and the invention contemplates multiple and/or different and/or unique instruments 16 on each computing device. For example, without limitation, one device 10 could be affixed to a law enforcement officer's badge and could include an instrument package 16 to detect at least voice through at least one microphone, while a separate device 10 could be affixed to an officer's arm or wrist and could include an instrument package 16 to detect human physiological data. In this manner, multiple devices 10 can be affixed to the same user because certain locations on a user are more amenable to providing different useful data from instruments 16.

The embodiment in FIG. 2 further contains an emergency button 28 located near the top of device. The emergency button 28 is contemplated to be used as a backup or manual means of communicating a combative situation. Typically, to prevent false positives, the emergency button 28 would transmit an emergency signal only if pressed by a user for a certain time period or pressed by a user a certain number of times and also for a certain time period.

It is contemplated that the devices 10 may communicate with other devices connected to the same user through antennae to share at least device component functionality such as, without limitation, information from instruments 14, computing module processing power 18, data storage 20. In certain embodiments, devices 10 may be in close enough physical contact to provide for sharing of battery 16 power through a physical connection or an add-on to the device permitting wireless power sharing. In one embodiment, a law enforcement officer wears one device 10 and a separate device is connected to or inside of the officer's service vehicle 10. The devices communicate with each other to share data and other information, including the location of the devices 10 relative to each other. Accordingly, the devices 10 in this embodiment can determine the vector of travel of an officer in real time and therefore can better detect the presence of a combative situation. For example, certain patterns of vector and location between an officer and his or her service vehicle may indicate the presence of a combative situation with a high likelihood of accuracy because certain erratic vectors of travel may not be present in normal or non-combative situations. As an example, officers may engage in combative situations where they are fighting a perpetrator in hand-to-hand combat nearby their vehicle, which may create erratic location and vector patterns indicative of the combative situation. Further, officers may run back to a vehicle for safety, or to begin pursuit of a perpetrator and the action of running back to a vehicle may create erratic location and vector patterns indicative of a combative situation. Still further, officers may run away from a vehicle to pursue a perpetrator which may create erratic location and vector patterns indicative of a combative situation. In these examples, the device 10 would typically have a heart rate monitor and microphone which may create instrument 14 measurements corroborating the combative situation and permitting the device 10 to report a combative situation back to the law enforcement agency with a higher degree of accuracy.

Figure 3:
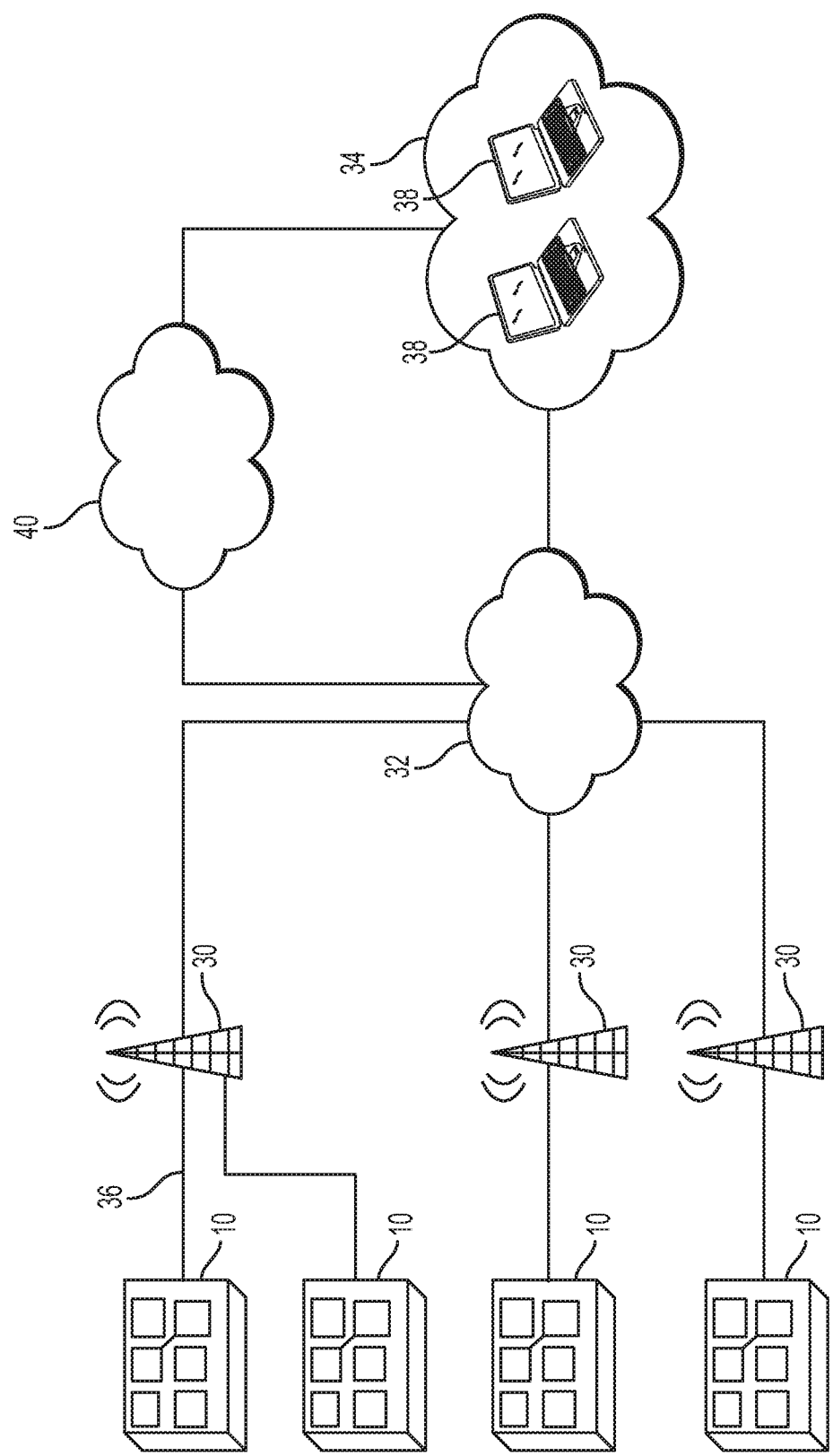
FIG. 3 illustrates a network transmission or communication embodiment of the invention.

FIG. 3 illustrates an embodiment of a network capable of connecting a plurality of devices 10 through commercial cellular towers 30 via wireless transmission 36, and through the internet 32 to remotely located computing devices such as computers or servers 38 on a proprietary network 34. As indicated on FIG. 3, a plurality of devices 10 can connect with the same or different cellular towers 30 via wireless transmission 36. It is further contemplated that the devices 10 may be connected to any public network (not only to the internet 32 or World Wide Web), or such devices 10 may be connected to such public network by means other than through wireless transmission 36 to a cellular tower 30. For example, other access points to the internet are contemplated which would subsequently connect the device 10 to a proprietary law enforcement network such as through local Wi-Fi. In other embodiments, there can be a further step between device 10 transmission where the device 10 locally transmits to a nearby service vehicle or other property owned by a law enforcement agency which then transmits the signal to an internet access point and to a proprietary server 38 or directly from a service vehicle back to the agency headquarters or to the local precinct.

In a typical embodiment, the computers 38 on a proprietary network 34 are owned by a law enforcement or similar agency. The devices 10 are in communication with the computers 38 to transmit instrument data, readouts, device status, or processed information or data. The computers 38 are monitoring the devices 10 at all times when such devices 10 are active (e.g., worn by an on-service officer) and are operating software to detect and respond to emergency signals from the devices 10.

Communication between the device 10 and the servers 38 in FIG. 3 is typified by information related to the instrument 14 measurements on the device 10. In one embodiment, the device 10 may communicate if and when the computing module 18 processes information locally from at least one instrument 14 and determines a high likelihood of a combative situation. Such determination may be the result of comparing instrument 14 data with pre-programmed information or data on the device 10. Or in other embodiments, the computing module 18 may, in addition to a local comparison, transmit its analysis along with pre-processed instrument 14 data. Such processing and/or pre-processing of instrument 14 data is advantageous in a combative situation because time is critical to the safety of those engaged in the situation, and the signal sent to a proprietary network 34 computer should typically contain only the bare essential information to ensure speed of transmission. When a combative situation is determined with a high degree of confidence by the device 10 then typically certain instruments 14 in the device 10 will begin real-time streaming either with raw instrument measurements from important sensors (such as motion, acceleration, heart rate, microphones, cameras) or depending on the bandwidth or speed of the connection the device 10 will begin real-time streaming pre-processed or roughly or quickly pre-processed data from such instrument measurements. This provides the law enforcement agency with important real-time information to further assess the combative situation, its outcome, and the officer's actions, and permits the agency to provide the officer with advice, instructions, or updates.

In certain embodiments, as indicated in FIG. 3, the proprietary network is connected either directly, or through the internet 32, to a further proprietary network 40 in order to better facilitate a response to a combative situation. The further proprietary network could be a public emergency service network, such as those operated by cities and counties providing 911 service. Or the further proprietary network could be owned or operated by a wholly different law enforcement or other agency that help to facilitate a response to a combative situation. In one example embodiment, the proprietary network 34 that receives the emergency communication about the combative situation from any of the devices 10 on the network is a citywide law enforcement agency. The citywide law enforcement agency proprietary network 34 connects to the state police law enforcement network 40 through direct means or through the internet to relay information about the combative situation. It is contemplated that the proprietary networks could be any combination, e.g., the first network receiving the emergency signal could be from a highway patrol device 10 to a highway patrol network 34, which subsequently identifies and transmits a signal to the particular local law enforcement network 40 that is closest to the location information communicated by the device 10.

In further embodiments, a plurality of devices 10 in FIG. 3 could each independently create and transmit an emergency signal at the same time, or around the same time (e.g., without limitation, preferred embodiments contemplate signal creation by a plurality of devices within 0-15 minutes of each other, and more preferred embodiments contemplate signal creation by a plurality of devices within 0-3 minutes of each other). Upon receipt by the law enforcement network 34 computer(s) 38 of a plurality of signals from a plurality of devices 10, the network may prompt an elevated alarm, or "super alarm." Such an elevated alarm would cause the law enforcement agency to dispatch a greater response and with a faster response speed, if possible. Additionally, an elevated alarm or "super alarm" may cause the network 34 or law enforcement officials to contact a particular second law enforcement network 40 or agency with a special request or simply to indicate the elevation of an alarm. As one example, the second law enforcement network 40 or agency contacted in the event of an elevated alarm may be selected from any combination of a federal agency, an agency in different state jurisdiction, or an agency with specialized training or equipment, e.g., a SWAT team, a terrorist task force, a bomb squad, a hostage rescue negotiator or team, transportation law enforcement, fire department, a different state's law enforcement agency, and/or the FBI or ATF.

In one further embodiment, a proprietary computer or server on the internet 32 would actively monitor for a plurality of device signals, evaluate the severity of the combative situation, and contact the first or second proprietary networks 34, 40 and/or contact other selected agencies, proprietary networks, or response teams.

Figure 4:
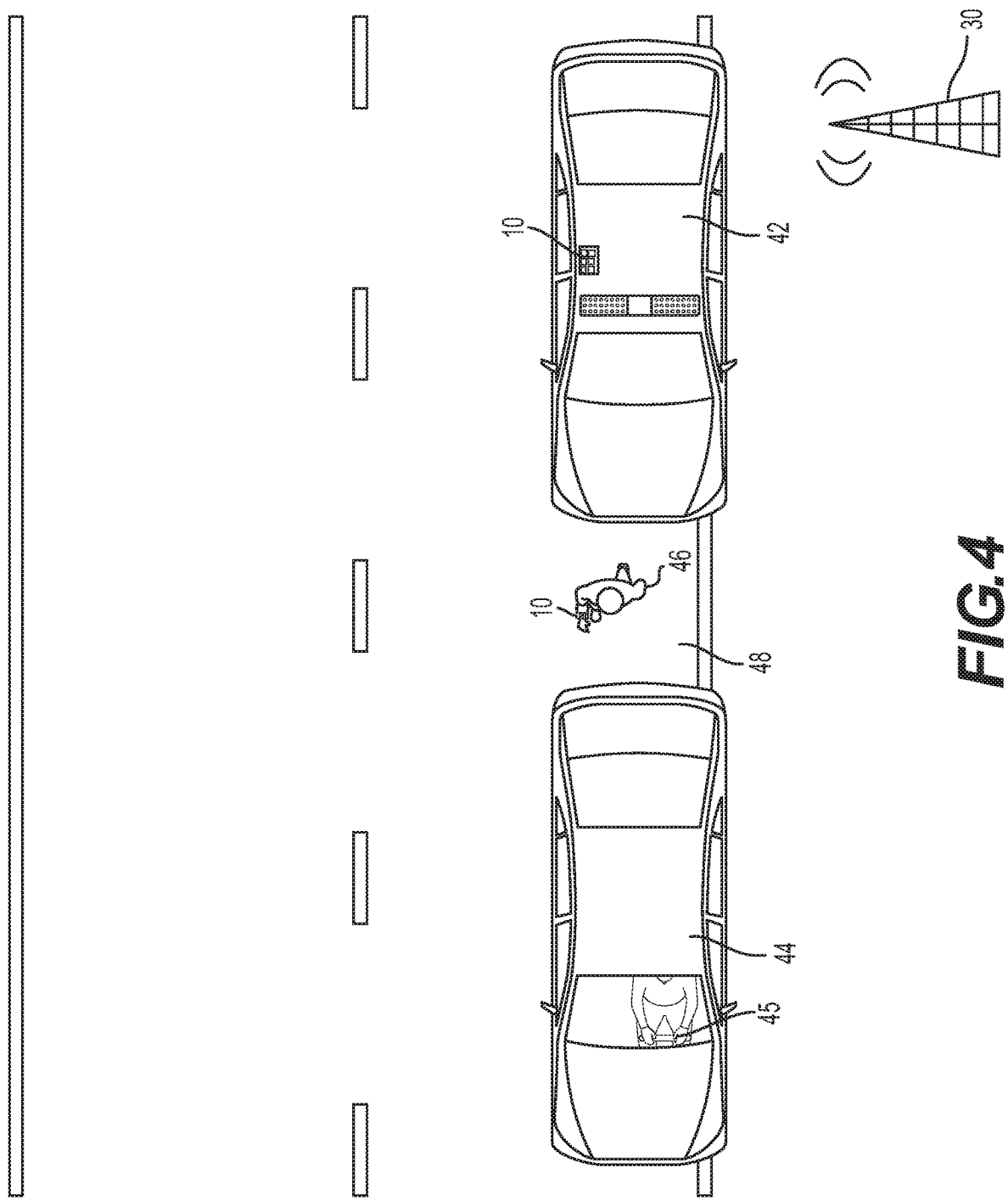
FIG. 4 illustrates an embodiment of the invention used by a law enforcement agency.

FIG. 4 illustrates an embodiment of the invention through an example of the development of a combative situation. In FIG. 4, an officer 46 wearing at least one device 10 was driving in a service vehicle 42 but has exited the service vehicle 42 and is proceeding towards a suspect or perpetrator's vehicle 44. The service vehicle 42 contains a device 10 as well, and the two devices are locally connected through Wi-Fi. Both devices are also independently connected to a cellular tower 30.

As the officer 46 walks towards the vehicle 44, the instruments in the officer's device 10, and the service vehicle device 10 are actively monitoring for external stimulus. In this embodiment, each device 10 has a microphone, and the officer's wearable device 10 additionally comprises a heart pulse monitor, and a set of motion detectors comprising at least one accelerometer and/or gyroscope. After the officer 46 left the service vehicle, the computing modules in the devices recognized the changes due to a location separation from the devices, and the officer's wearable device 10 changed the type of pre-programmed data used in analysis of instrument measurements from a driving mode to an outside mode. Thus, as the officer 46 walks towards the vehicle 44 the microphone picks up the walking noises on the road 48, compares them to a pre-programmed data for normal outside walking on a road 48, and along with analysis of data such as motion and stride, determines there is no combative situation. The officer 46 reaches the suspect's vehicle 44 and begins to talk to the suspect 45. The officer's device 10 picks up normal speech patterns and determines there is no combative situation. Unexpectedly, the suspect 45 exits and leaves the vehicle 44 and runs away from vehicle towards the edge of the road 48. This causes the microphone on the device 10 to pick up running noises, and the sound of a car door quickly opening. In most embodied analysis configurations of the device 10, this would not be enough instrumental evidence to indicate a combative situation and send an emergency signal. However, directly after, the officer begins running after the suspect and heart pulse increases because of physical activity and adrenaline. Additionally, at this point the microphone on the officer's device 10 picks up yelling by the officer, movement in brush on the side of the road 48. The officer's device 10 also detects range of movement indicating running, and further determines a vector and location pattern of the officer with respect to the device in the service vehicle 42. The computing module analyzes all of the instrumental evidence by comparing to a pre-programmed package of values and determines that a combative situation has begun. The officer's device 10 then attempts to send a signal through the cellular tower 30 to the officer's law enforcement agency headquarters where the proprietary network configured to receive such emergency signals is located. The signal includes location information from a GPS unit on the officer's device 10, and vector information.

Upon receipt of at least one emergency signal, the law enforcement agency determines the location of its closest officers to support the officer 46 and immediately dispatches them. The officer's device 10 continues to relay information to the law enforcement agency so that administrators and supporting officers can actively monitor the development of the situation. Such information relayed after an emergency signal may include any type of instrument information, including pre-processed or raw, e.g., microphone and camera output, heart rate, vector, and location. In particular, vector coupled with location can provide supporting officers with useful information about where the suspect 45 and pursuing officer 46 might be headed. The supporting officers can thus quickly anticipate a route to intercept the pair or advise the pursuing officer 46 appropriately. Such communication through the officer's device 10 is far more efficient and superior to verbal communication over a radio which may be impossible in many combative situations.

In certain embodiments, as a backup for redundancy the service vehicle device 10 in communication with the officer's device 10 determines a combative situation as well (or is informed of the same conclusion by the officer's device), and the service vehicle device 10 also transmits an emergency signal. This separate transmission may be advantageous if during the combative situation the officer's wearable device 10 antenna is damaged.

Similar embodiments exist where, instead of a service vehicle 42 having a device 10, a separate property item, or designated physical location such as a local "base of operations" has an extra device 10. This is especially useful for certain law enforcement agencies and military organizations that may move from location to location or may expect to be engaged in combative situations without a stationary service vehicle nearby.

Figure 5:
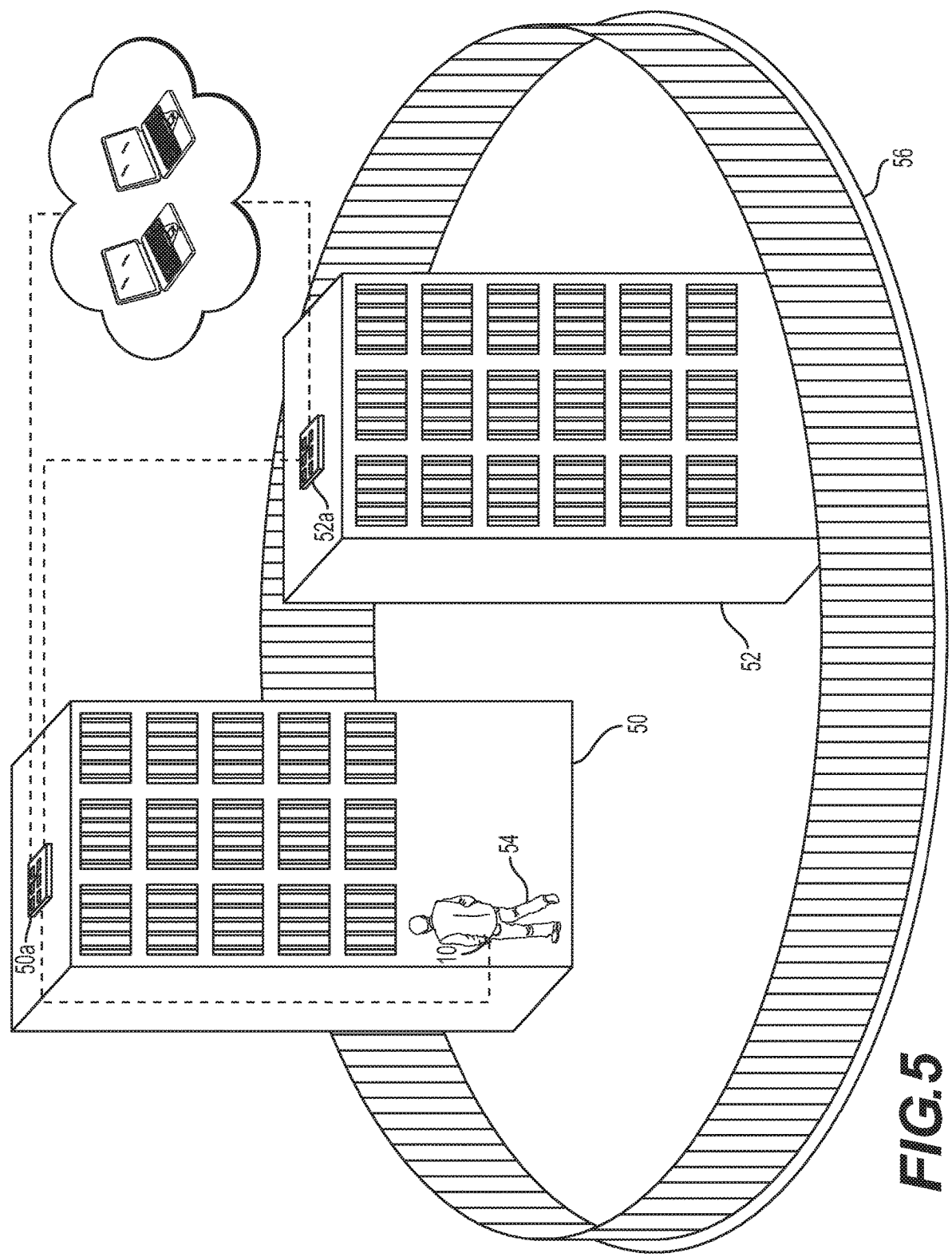
FIG. 5 illustrates an embodiment of the invention used in a building or collection of buildings.

FIG. 5 illustrates an embodiment of a device 10 which is worn by an individual 54 inside of a building 50. There is a separate building nearby 52. Each building has specialized devices 50a, 52a to monitor at least one device worn by at least one individual. The device 10 transmits information to the devices 50a, 52a, and in turn the devices 50a, 52a are linked to a network of computers. Additionally, there is a virtual perimeter 56 that also may optionally be associated or correspond with a physical perimeter such as a fence. The perimeter 56 is the outside range of the devices 50a, 52a detection of a device 10. In the embodiment of FIG. 5, the perimeter is 56 is also outside of a physical barrier surrounding the buildings 50 such as a fence. This configuration may be preferable for prisons as a way to determine with greater certainty whether an incarcerated individual has escaped the premises. However, the perimeter 56 is contemplated to also be on the inside of a physical barrier such as a fence in other configurations.

In one embodiment, a prison compound is comprised of the buildings 50, 52. The individual 54 wearing the device 10 inside the prison compound 50, 52 is incarcerated. In this particular embodiment, the device has a microphone, measures temperature, location and vector information with respect to itself and with respect to the devices 50a, 52a, and contains an instrument to determine the presence of any liquid. Typically, the device 10 would connect with the devices 50a, 52a via Wi-Fi, Bluetooth, Z-wave, or similar such technology. The computing module in the devices 50a, 52a is configured to determine whether the device 10 is in an unauthorized location, or may be in unauthorized location, or is not a safe location. If any such condition is met, then the devices 50a, 52a connect to a proprietary prison network and issue a signal to guard staff. Typically, the devices 50a, 52a would connect to such network via a communication cable such as Ethernet, or through Wi-Fi. Generally, connection to the internet is not required, but other such embodiments are also contemplated.

In one example that illustrates the embodied functionality of the device 10, the individual 54 attempts to leave the prison building 50 by non-traditional means, i.e., not through typical exits or entryways. This could be by an escape, for example through a sewer or air vent, or through a hole in or under the wall. However, the device 10 is transmitting information to the devices 50a and 52a. Based on vector path and location of the individual 54, including, but not limited to, location transmitted by the device 10, and determined with respect to the devices 50a, 52a, the devices 50a, 52a determine that the individual has passed through the boundaries of the building 50. This prompts an alarm to the prison staff of an escape attempt and transmission of key information to officials searching for the escaped individual 54. If the individual continues outside of the perimeter 56 then additional alarms may be sent to local law enforcement. Further, if the individual 54 escapes out of the perimeter certain embodiments of the device 10 will have built-in cellular technology and the device 10 on the escapee 54 could then connect to local cellular towers and transmit information to prison officials and local law enforcement agencies. Typically, in the case of a prisoner or inmate, the device would be affixed to the prisoner in a tamper-proof fashion, and may also have comprise a separate sensor or instrument providing an alert should the device be tampered with or removed.

Additionally, the device may detect increased heart rate or certain types of movement from the individual 54 at certain times of the day that indicate such findings are irregular. Depending on the number of instrument readings on device 10 compared with the pre-programmed values, different levels of alarm could be prompted. For example, a sudden increase heart rate with changing location information inside the building 50, but no other irregular sensor data, could prompt a lower level alarm to investigate. On the other hand, accelerometer detection of a person crawling and breathing heavily in the middle of the night with accompanying sounds of scuffling on rock may prompt a higher-level alarm for investigation because this could represent an escape attempt. Certain instruments may be selected based on expected or perceived escape routes. For example, if there is a sewer system under the prison compound that is susceptible to intrusion and difficult to seal off, then a liquid detection instrument could be added to the device 10. Such an instrument could be tuned through the pre-programmed values such that the instrument must detect a presence of liquid of a certain composition for a certain time period before the computing module flags the reading. As another example, in a temperate climate a temperature sensor may be selected for the device—this could indicate if a prisoner is outside when he or she should not be. It is noted that no instrument by itself is likely to detect an escape, except perhaps location and/or vector information, and that certain of these instruments may be altered to create a false negative during an escape. However, it is contemplated that a collection of different instruments in a device 10 maximizes the changes of proper monitoring of prisoners and minimizes the chances of escape or improper activity. In a further embodiment of the invention, an instrument of the device or the device itself would be placed in the sole of the shoe, or under a sock or other footwear. Thus, in the event an escape occurs through a human "ladder," e.g., to reach a ceiling vent, the device would determine a significant increase in perceived body weight.

In further embodiments, a device 10 comprising a heart rate monitor instrument 14 is contemplated as being used for incarcerated or detained individuals in prisons and/or jails or other detention facilities or environments. In typical embodiments, the device 10 may detect elevated heart rates resulting from not only combative situations, but also from drug or illegal, controlled, or not permitted substance(s) or abuse(s) of the same, and transmit the heart rate data, or a signal to alert prison, jail, detention officials, or other officials responsible for those incarcerated or detained. Certain embodiments may detect patterns of heart rate elevation that indicate in particular the usage of a drug or other substance, e.g., without limitation, to indicate a drug induced "high," and inform officials about the identification of the drug or substance. Upon receiving a signal, officials may dispatch employees, guards or other officials to the location of the device 10 and seize the drug or substance along with any related paraphernalia or contraband. Additionally, the individuals responding to the signal may also search the premises near the device 10 such as a cell, workout area, restroom, restroom stall, shower area, recreational area, or yard. Further, individuals responding to certain signals may come prepared with medical or emergency devices, kits, or other substances, or may recruit medical providers, to help treat, cure, resolve or otherwise return an individual to a stable or normal condition following an overdose or other medical issue resulting from the use or abuse of a substance.

In typical embodiments, the device 10 would periodically check to determine whether the instruments and other components in the device 10 are properly working and send a status report to the local prison network to confirm that there was no interference with the device 10.

In an additional embodiment, in certain prisoners are required to be in certain locations or buildings at certain time periods. In this embodiment, if a prisoner slept in building 50, but was present in building 52 during sleeping hours, then the device 52a would detect the device location (along with the device 10 sending its location) and promptly create an alarm for prison staff to investigate.

In other embodiments, prison staff or guards could wear the device. This could create increase safety and security because irregular instrument readings, including physiological, location, and vector information, could indicate that the staff or guards are in an unsafe situation, or a combative situation.

In still other embodiments, either or both buildings 50, 52 are not part of a prison but rather are part of a home or two neighboring houses, or a government compound such as an embassy. In these such situations, occupants or short-term or long-term visitors to the buildings 50, 52 or inside the perimeter 56 could utilize the devices 10 for general safety. The individuals wearing such devices 10 could feel confident that their physiological data, and other data such as about their location and vector, was being monitored by the wearable device 10 and by the devices 50a 52a incorporated into the buildings 50, 52. Accordingly, certain combative situations or more broadly irregular or unsafe situations near to or against the individuals wearing the devices 10 could be detected and emergency personnel either external or internal to the buildings 50, 52 could be immediately dispatched. Certain such situations in these embodiments that could be detected include, without limitation, gunfire, fire, household accidents, home invasion, domestic abuse, workplace violence, loud altercations or disagreements and/or terrorist attacks. In any such situation, an alarm could be created by the devices 50a and/or 52a to alert emergency personnel. As contemplated herein, different levels of alarms could be created depending on the type of situation detected by the device.

In certain other embodiments, the invention contemplates that a plurality of devices are worn by a plurality of individuals in a neighborhood, schools or other public areas. If a certain threshold of devices in the same neighborhood, e.g., a majority of the devices, indicate any threshold of alarming conditions within certain time constraints, which could range from minutes up to multiple days or weeks, then certain government or law enforcement officials could be notified by alarm. In this fashion, the devices 10 worn by members of a community could indicate broader community stress levels that could prompt investigation by officials into the causes of the community-wide stress. Certain causes that could prompt the alarm, all with varying time periods of measurement and alarm thresholds, include an active shooter, a fire, or elevated violent or non-violent gang activity occurring over days or weeks.

Figure 6:
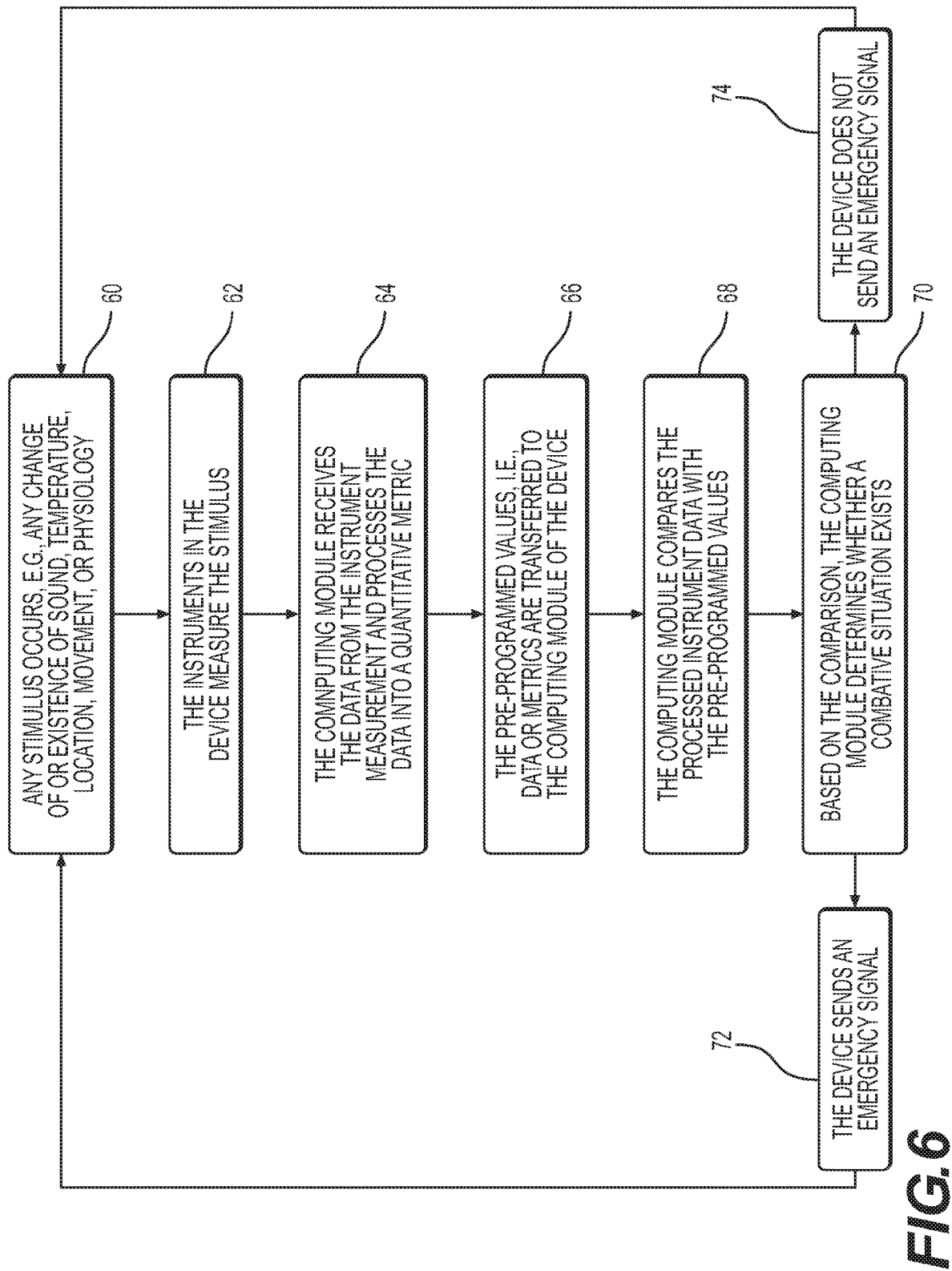
FIG. 6 illustrates a method chart of an embodiment of the invention.

FIG. 6 illustrates a typical embodiment of the device functionality in a flowchart form. This particular embodiment would generally be expected to be used by law enforcement. Here, the pre-programmed values are already in the device, but it is understood in the art that such values may change per configuration of the device in different settings, or with improved values based on research or other information, or in real time by a remote computer connected to the device. Further embodiments contemplate that there are no pre-programmed values in the device, and all comparison and determination of a combative or other situation is conducted by a remote server receiving raw and/or pre-processed instrument data. Further, the embodiment of FIG. 6 illustrates a determination of a combative situation, but the computing module could also be programmed to determine the existence of an unsafe situation, or an escape situation.

Any stimulus occurs 60, e.g., any change of or existence of sound, temperature, location, movement, or physiology, the instruments in the device measure the stimulus 62. The computing module 64 receives the data from the instrument measurement 62 and processes the data into a quantitative metric. The pre-programmed values, i.e., data or metrics 66, are transferred to the computing module of the device. The computing module compares the processed instrument data with the pre-programmed values 68. Based on the comparison, the computing module determines whether a combative situation exists 70. Based on this determination, the device either sends an emergency signal 72, or does not send an emergency signal 74. In either situation, the cycle repeats with a new stimulus and measurement thereof.

It is understood by those in the art that all of the embodiments and examples in the disclosures above describing law enforcement officer(s) in this disclosure could similarly include or apply to any law enforcement officer, private security employees, military personnel, prison guards, juvenile detention staff, neighborhood watch volunteers, bodyguards, and anyone else with a legal, personal, religious, ethical or other duty or obligation to provide protective services to any other persons or to any property.

It is understood by those in the art that persons who may wear the device, broadly, are any person and the families of any person regardless of location, for example, without limitation, whether at home or in public, and additionally anyone who is being actively or passively protected or guarded against harm arising from a real or perceived combative situation, including, without limitation, dignitaries, politicians, high net-worth individuals, high-value individuals, individuals with specialized and/or highly valuable or irreplaceable skills or knowledge, executives, religious figures, celebrities, "VIPs," and the families of all of those above, and additionally those individuals to which any officer is expected to owe a duty or obligation of protection, including employees, contractors, jailed individuals, incarcerated individuals, those on probation, arrested individuals, and detained individuals, including, without limitation, refugees or immigrants. Similarly, alerting mechanisms and proprietary servers can be applied as a commercial service for individuals to purchase on a subscription basis for themselves or their families. Additionally, a device may be worn by employees that may be at risk of a combative situation, such as bank employees, gas station employees, or convenience store employees.

As required, detailed embodiments of the present invention are disclosed herein; however, while various embodiments and examples of this invention have been described above, these descriptions are given for purposes of illustration and explanation, and not limitation. Variations, changes, modifications, and departures from the systems, apparatus and methods disclosed above may be adopted without departure from the spirit and scope of this invention. Moreover, specific structural and functional details disclosed herein are not to be interpreted as limiting, but merely as a basis for the claims and as a representative basis for teaching one skilled in the art to variously employ the present invention. It will be apparent to those skilled in the art that many changes and substitutions may be made to the foregoing descriptions of preferred embodiments and examples without departing from the spirit and scope of the present invention, which is defined by the appended claims.

Further, the purpose of the Abstract is to enable the various patent offices and the public generally, and especially practitioners in the art such as law enforcement officers and those who manage or supervise or purchase and/or evaluate technology for or on behalf of agencies or departments employing or relying on the same, but who may not be familiar with patent or legal terms or phraseology, to determine quickly from a cursory inspection the nature and essence of the technical disclosure of the application. The Abstract is not intended to be limiting as to the scope of the invention in any way.

What is claimed is:

1. A device capable of transmitting emergency information without the need for user input when worn by a user comprising instruments, pre-programmed instrument metrics, a central processing unit, and a wireless communications apparatus;
   wherein at least one instrument comprises a video camera and/or an audio recorder;
   wherein at least one instrument monitors location information when worn by the user;
   wherein at least one instrument monitors the presence of loud voices when worn by the user;
   wherein at least one instrument monitors a user's pulse when worn by the user;
   wherein the central processing unit monitors vector of travel of the user in real time in order to detect the presence of patterns indicative of combative situations;
   wherein the central processing unit determines a combative situation based on a sudden change in the vector pattern of a user;
   wherein the device, without the need for user input or to continuously record audio and/or video, transmits an emergency signal through the wireless communications apparatus to a remote computing device in response to the sudden change in the vector pattern of a user.

2. The device of claim 1 wherein the remote computing device comprises at least one server owned or leased by a law enforcement agency.

3. The device of claim 1 wherein the device is implanted.

4. The device of claim 1 wherein the device is worn by a law enforcement officer as part of his or her duties.

5. The device of claim 4 wherein the camera output is video in the typical human visual field, and wherein the camera output and other instrument output is routinely stored by a law enforcement agency.

6. The device of claim 4 wherein law enforcement officials monitor emergency signals and respond by sending other law enforcement officers to combative situations.

7. The device of claim 1 wherein the device is worn by prisoners, jailed individuals, or detainees.

8. The device of claim 7 wherein the wireless communications apparatus is localized to a prison, jail, detention facility, and its perimeter.

9. The device of claim 8 wherein prison, jail, or detention officials monitor emergency signals and respond by visiting the location of the device.

10. A system comprising:
    a plurality of wearable devices capable of transmitting emergency information without the need for user input comprising at least one instrument that monitors location information when worn by a user, at least one instrument that monitors a user's pulse when worn by the user, at least one instrument capable of video and/or audio recording, and at least one instrument that monitors for the presence of loud voices when worn by the user, at least one central processing unit capable of monitoring vector of travel of the user in real time and determining vector patterns based on the location information when worn by the user, and at least one wireless communications apparatus capable of sending an emergency signal when worn by the user;
    a proprietary network comprising at least one server owned or leased by a law enforcement agency, wherein the proprietary network is connected to the internet and capable of communicating with the plurality of wearable devices;
    wherein such proprietary network may receive the emergency signal from at least one such wearable device based on a sudden change in the vector information, without the need for user input or to continuously record audio and/or video, which prompts an alarm and triggers the transmission of a subsequent communications signal to at least one law enforcement official in response to the emergency signal;
    wherein such subsequent communications signal provides real-time location information and vector information from the device in response to vector information based on the location information.

11. The system of claim 10 wherein the proprietary network prompts an elevated alarm in response to receiving an emergency signal from two or more wearable devices, which triggers a greater and faster response to the emergency signal by the law enforcement agency.

12. The system of claim 11 wherein the law enforcement officials are selected from at least one of the following: local police, state police, federal agency.

13. The system of claim 12 wherein at least one coordinating official is monitoring real-time location information and vector information.

14. The system of claim 13 wherein the at least one instrument capable of video and/or audio recording comprises a camera with a video output in a human field of vision.

15. The system of claim 14 wherein said subsequent communications signal further provides real-time camera output.

16. The system of claim 11, wherein the proprietary network prompts an elevated alarm in real time in response to receiving an emergency signal from two or more wearable devices within 0-15 minutes of each other.

17. A device capable of transmitting emergency information without the need for user input being affixed to a vest of a user comprising a plurality of instruments, pre-programmed instrument metrics, a central processing unit, data storage, and a wireless communications apparatus;
wherein at least one instrument monitors location information of the user compared to a base station unit affixed to a vehicle;
wherein at least one instrument monitors the presence of force applied to a body of the user wearing said vest;
wherein at least one instrument comprises a video camera;
wherein at least one instrument comprises an audio recorder;
wherein at least one instrument monitors the user's pulse;
wherein the central processing unit monitors vector pattern information of the user in real time based on the location information;
wherein the central processing unit determines a combative situation based on a change in the vector pattern of the user compared to a pre-programmed metric,
wherein the device, without the need for user input or to continuously record audio and/or video, transmits an emergency signal through the wireless communications apparatus to a law enforcement agency in response to a sudden change in vector information based on the location information.

18. The device of claim 17 wherein the vest is a protective vest used by an on-duty law enforcement officer.

19. The device of claim 17 wherein the vehicle is a police cruiser owned or operated by a local law enforcement agency.

20. The device of claim 18 wherein the device begins to gather instrument readings and compare them with pre-programmed metrics only when a law enforcement officer exits the vehicle.

* * * * *